United States Patent
Schwoerer et al.

(10) Patent No.: US 6,302,370 B1
(45) Date of Patent: Oct. 16, 2001

(54) VALVE SEATING CONTROL DEVICE WITH VARIABLE AREA ORIFICE

(75) Inventors: John A. Schwoerer, Storrs; Edward T. Leitkowski, Colchester, both of CT (US)

(73) Assignee: Diesel Engine Retarders, Inc., Christiana, DE (US)

( * ) Notice: Subject to any disclaimer, the term of this patent is extended or adjusted under 35 U.S.C. 154(b) by 0 days.

(21) Appl. No.: 09/383,987

(22) Filed: Aug. 26, 1999

Related U.S. Application Data
(60) Provisional application No. 60/101,411, filed on Sep. 22, 1998, and provisional application No. 60/098,168, filed on Aug. 26, 1998.

(51) Int. Cl.$^7$ .................................................. F16K 31/12
(52) U.S. Cl. .............................................. 251/48; 251/35
(58) Field of Search ............................... 251/48, 54, 35, 251/12; 137/514, 514.5; 188/280, 288

(56) References Cited

U.S. PATENT DOCUMENTS

| | | | |
|---|---|---|---|
| 3,782,412 | * 1/1974 | Darash | 137/514 |
| 4,206,728 | 6/1980 | Trenne . | |
| 4,515,252 | * 5/1985 | Hidaka et al. | 137/512.1 |
| 4,515,343 | * 5/1985 | Pischinger et al. | 251/48 |
| 4,862,844 | 9/1989 | Wakeman et al. . | |
| 4,874,066 | * 10/1989 | Silberstein | 137/514.5 |
| 4,889,084 | 12/1989 | Rembold . | |
| 5,158,048 | 10/1992 | Robnett et al. . | |
| 5,186,141 | * 2/1993 | Custer | 123/321 |
| 5,190,262 | * 3/1993 | Woollatt | 251/48 |
| 5,221,072 | 6/1993 | Erickson et al. . | |
| 5,255,705 | * 10/1993 | Uehara et al. | 251/35 |
| 5,275,136 | 1/1994 | Schechter et al. . | |
| 5,460,131 | 10/1995 | Usko et al. . | |
| 5,485,813 | 1/1996 | Molitor et al. . | |
| 5,537,976 | 7/1996 | Hu . | |
| 5,577,468 | 11/1996 | Weber . | |
| 5,582,141 | 12/1996 | Meyer . | |
| 5,606,940 | 3/1997 | Shafer et al. . | |
| 5,619,964 | 4/1997 | Feucht . | |

OTHER PUBLICATIONS

B. Gecim. "Analysis of a Lost–Motion–Type Hydraulic System for Variable Valve Actuation," for General Motors Research.

F. Vattaneo, "Experiences with an Electrohydraulic Variable Valve Actuation System on a Four–Cylinder SI Engine," FIAT Research Center—Orbassano, Turin.

W. Gotz. "Hydraulics. Theory and Applications," Bosch–Quality Training, Robert Bosch GmbH, Ditzingen, Germany (1998).

Unknown. "3.7 Lost Motion Systems, Chapter 3 Approaches to Variable Valve Actuation," presented at University of Canterbury, New Zealand (Jul. 2, 1996).

P. Nuccio. "Variable Valve Timing as a Means to Control Engine Load," 13$^{th}$ FISITA Congress No. 71 p. 1 (1971).

* cited by examiner

Primary Examiner—Kevin Shaver
Assistant Examiner—Eric Keasel
(74) Attorney, Agent, or Firm—David R. Yohannan; Collier Shannon Scott, PLLC

(57) ABSTRACT

A system for decelerating a linearly displaceable valve undergoing a closing motion is disclosed. The system includes a housing, a first hydraulic fluid chamber provided in said housing, and a slave piston for displacing the valve in response to the supply of hydraulic fluid to the first hydraulic fluid chamber. Deceleration of the valve may be accomplished by selectively throttling the release of hydraulic fluid in the first chamber to a second chamber. The hydraulic pressure in the second chamber opposes the closing motion of the valve, thereby slowing it gently for a valve seating event. Progressive throttling is used to maintain nearly constant hydraulic pressure in the second chamber during the seating event. The progressive throttling may be accomplished by selection of an appropriate throttling orifice size and shape, as well as an appropriate throttling profile for the orifice.

28 Claims, 8 Drawing Sheets

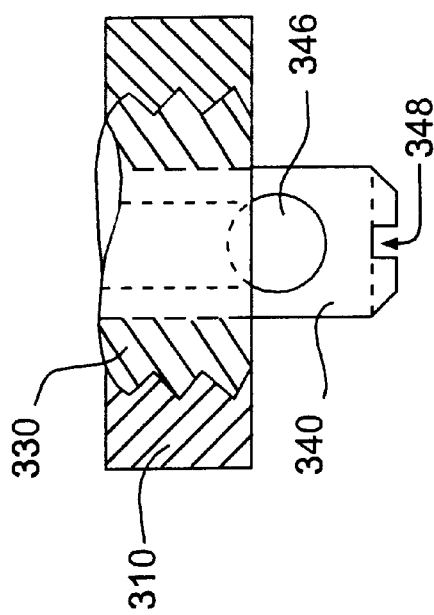
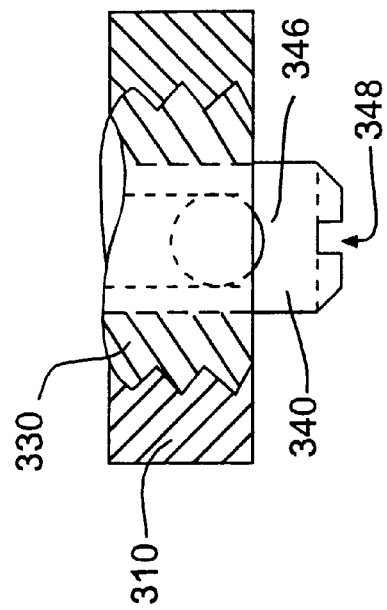
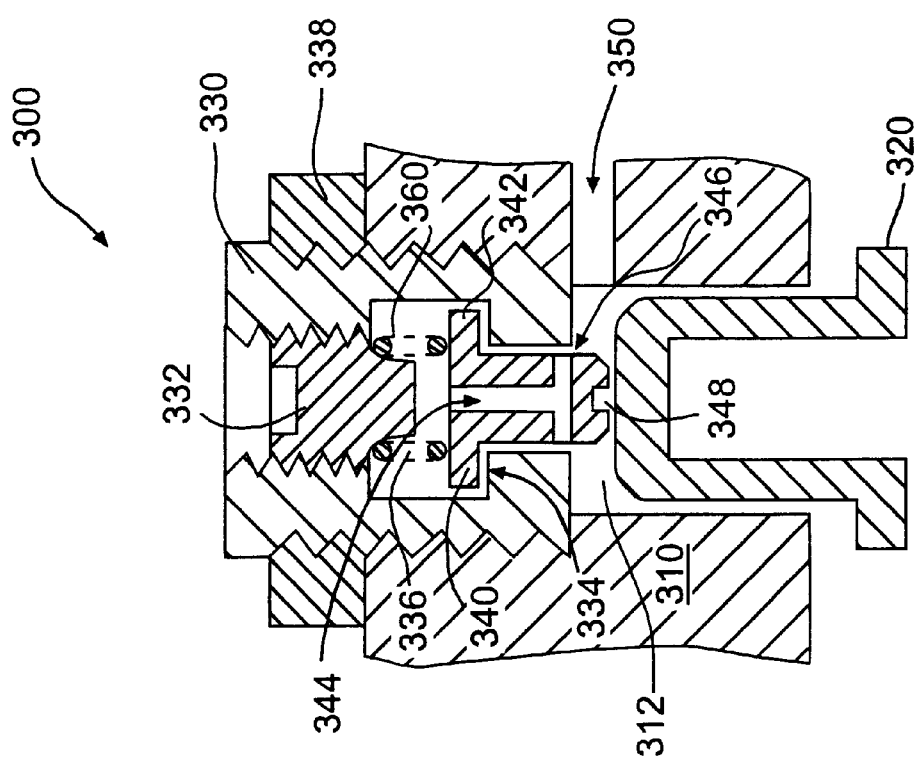

VALVE SEATING CONTROL DEVICE WITH VARIABLE AREA ORIFICE

CROSS REFERENCE TO RELATED PATENT APPLICATIONS

This application is related to and claims priority on Provisional Application Ser. No. 60/098,168 filed Aug. 26, 1998, entitled "Valve Seating Control Device With Variable Area Orifice;" and Provisional Application Ser. No. 60/101, 411 filed Sep. 22, 1998, entitled "Valve Seating Control Device With Variable Area Orifice."

FIELD OF THE INVENTION

The present invention relates to the operation of poppet valves. In particular, the invention relates to controlling valve seating velocity, and is particularly useful for the seating of internal combustion engine valves.

BACKGROUND OF THE INVENTION

An example of an engine valve actuator is disclosed in U.S. Pat. No. 5,186,141, "engine Brake Timing Control Mechanism", issued to D. Custer on Feb. 16, 1993 (the "'141 patent"), incorporated by reference herein. The actuator disclosed in the '141 patent does not provide for engine valve seating control, although it could benefit from such control. FIG. 1 discloses the engine valve actuator of the '141 patent.

The problem addressed by this invention is to provide acceptable engine valve seating velocity in a variable valve actuation (VVA) system. Hydraulic lost motion valve actuation systems may be driven with a cam. The hydraulic displacement of an engine valve in such a lost motion system is directly proportional to the displacement provided by the cam during normal operation. In some applications, however, the engine valve must be closed at an earlier time than that provided by the cam profile. This earlier closing may be carried out by rapidly releasing hydraulic fluid to an accumulator in the lost motion system. In such instances, however, engine valve seating control is required because the rate of closing the valve is governed by the hydraulic flow to the accumulator instead of by the fixed cam profile. Engine valve seating control may also be required for applications (e.g. centered lift) in which the engine valve seating occurs on a high velocity region of the cam. Still further, engine valve seating control is required in common rail VVA designs, in which all seating events occur as a result of the release of hydraulic fluid, possibly to an accumulator.

Devices designed to gently seat engine valves have been developed in order to address the needs of systems that require valve seating control. For example, the valve catch system 100 shown in FIG. 2 was developed to provide valve seating control. The system 100 includes a slave piston 120 disposed within an actuator housing 110. The slave piston 120 is slidable within the housing 110 so that it may open an engine valve (not shown) below it. A screw body 130 extends through the top of the housing 110 and abuts against the slave piston 120 when the latter is in a resting position (i.e. engine valve closed). A plunger 140 is disposed within the screw body 130 and is biased towards the slave piston 120 by a spring 160. The screw body 130 may be twisted into and out of the housing 110 to adjust engine valve lash.

The plunger 140 serves to selectively limit valve seating speed velocity as the slave piston approaches its home position (engine valve closed), thereby allowing the engine valve to close more gently than it otherwise might. The plunger 140 is mechanically limited from extending beyond the screw body 130 by more than a preset distance δ, thus allowing the slave piston 120 to return rapidly until contacting the plunger, within δ of the valve seat.

The system 100 operates under the influence of hydraulic fluid provided through a passage 150 in the housing 110. During the downward (valve opening) displacement of the slave piston 120, hydraulic fluid flows through the passage 150 in the housing 110 and through the passages in the slave piston so that the slave piston is forced downward against the engine valve. During the upward (valve closing) displacement of the slave piston 120, the hydraulic fluid flows back through the passages in the slave piston 120 and out of the passage 150 in the housing 110. As the slave piston 120 approaches its home position, it forms a seal with the plunger 140. The seal between the plunger 140 and the slave piston 120 results in the building of hydraulic pressure in the space between the slave piston and the end wall of the housing 110 as the slave piston progresses towards its home position. The building hydraulic pressure opposes the upward motion of the slave piston 120, thereby slowing the slave piston and assisting in seating the engine valve.

While the valve catch system 100 shown in FIG. 2, which works on slave piston pressure, has achieved acceptable valve seating velocity over a wide range of engine speeds and oil temperatures, improvements are still needed. For example, the valve catch system 100 tends to hold the engine valve open longer than is desirable for optimum engine breathing at high engine speeds. The system is also prone to reduce valve velocity to nearly zero prior to seating and thereafter accelerate the valve so that it seats at an unacceptable velocity. This type of valve catch system also may require a complicated slave piston design, which increases high-pressure volume, increases the length and flow resistance of the fluid path between the slave piston and the passages leading to the master piston, trigger valve, or plenum, and increases the required slave piston height and weight. Increased high-pressure volume may be detrimental to compliance. Increased flow path length and flow resistance produce increased pressure, whih may also be detrimental to compliance. Additionally, increased pressure drop may make it difficult to maintain master piston pressure greater than ambient during periods of decreasing cam displacement of high engine speed, which may allow air bubbles to form in the oil. Another difficulty that may be experienced with the valve catch system 100 is increased viscous dissipation, which may increase oil cooling load and parasitic power loss.

The valve catch system 200 shown in FIG. 3, which works on valve catch plenum pressure, is considered to have lower parasitic loss than the system shown in FIG. 2. The system 200 includes a slave piston 220 disposed within an actuator housing 210. The slave piston 220 is slidable within the housing 210 so that it may open an engine valve (not shown) below it. A screw body 230 extends through the top of the housing 210 and abuts against the slave piston 220 when the latter is in a resting position (i.e. engine valve closed). A plunger 240 is disposed within the screw body 230 and biased towards the slave piston 220 by a spring 260. The screw body 230 may be twisted into and out of the housing 210 to adjust engine valve lash. A fluid passage 250 through the housing 210 leads to a master piston (not shown) and/or a trigger valve (not shown).

The system 200 operates similarly to the system 100 shown in FIG. 2, except that in system 200, the hydraulic pressure that opposes the upward movement of the slave piston 220 is built inside the screw body 230. Although performance may be improved using the system 200, compliance difficulties may still be encountered due to the high pressures required and the increased compliance associated with the smaller area of plunger 240.

The embodiments of the present invention distinguish over the valve catch systems 100 and 200 shown in FIGS. 2 and 3. The various embodiments of the present invention include a variable area orifice in the system plunger. The embodiments of the invention have reduced compliance especially during decompression braking, higher master piston pressure during periods of decreasing cam displacement at high engine speed, reduced parasitic power loss and consequently reduced VVA housing cooling load, and reduced slave piston length and weight as compared with the valve catch system shown in FIG. 2. Furthermore, the embodiments of the innovation have reduced peak valve catch pressure as compared with the valve catch system, shown in FIG. 3. The variable flow restriction design in the invention is expected to be more robust than the constant flow restriction design with respect to engine valve velocity at the point of valve catch engagement and oil temperature and aeration. The variable flow restriction allows the displacement at the point of valve catch/slave piston engagement to be reduced, so that the valve catch has less undesired effect on the breathing of the engine.

OBJECTS OF THE INVENTION

It is therefore an object of the present invention to provide a system for valve seating control that progressively throttles the flow of hydraulic fluid from a hydraulic chamber opposing the valve closing motion.

It is yet another object of the present invention to provide a system for valve seating control that provides a nearly constant deceleration of the valve before seating.

It is still yet a further object of the present invention to provide a system for valve seating control that provides acceptable seating velocity during early valve closing events.

It is still another object of the present invention to provide a system for valve seating control that provides acceptable seating velocity during centered lift events when the valve seats on a high veolicty section of the cam.

It is still another object of the present invention to provide a system for valve seating control that has a less deleterious affect on valve opening events.

It is still another object of the present invention to provide a system for valve seating control that reduces the volume of hydraulic fluid in the master-slave piston circuit in order to reduce system compliance.

It is a further object of the present invention to provide a system for valve seating control with reduced parasitic loss and consequently reduced cooling requirements.

It is another object of the present invention to provide a system for valve seating control with improved hydraulic fluid aeration characteristics.

It still another object of the present invention to provide a system for valve seating control that utilizes a slave piston of reduced length and weight as compared to previous systems.

It is still a further object of the present invention to provide a system for valve seating control of relatively simple and low cost design.

SUMMARY OF THE INVENTION

In response to the foregoing challenge, Applicants have developed a system for decelerating a linearly displaceable valve undergoing a closing motion. The system may include a housing, a first hydraulic fluid chamber provided in said housing, and an assembly for displacing the valve responsive to the supply of hydraulic fluid to the first hydraulic fluid chamber. The system comprises: a second hydraulic fluid chamber for receiving hydraulic fluid from the first hydraulic fluid chamber during the valve closing motion; and means for throttling the flow of hydraulic fluid between the first and second hydraulic fluid chambers in response to a displacement of the throttling means by the valve displacing means, wherein hydraulic pressure in the second hydraulic fluid chamber opposes the valve closing motion.

The present invention is directed to a system for decelerating a linearly displaceable valve undergoing a closing motion. The system includes a housing, a first hydraulic fluid chamber provided in the housing, and assembly for displacing the valve responsive to the supply of hydraulic fluid to the first hydraulic chamber. The system also comprises a second hydraulic fluid chamber, wherein hydraulic pressure in the second hydraulic fluid chamber opposes the valve closing motion as the valve approaches a closed position. The system also comprises an assembly for throttling the flow of hydraulic fluid between the second and first hydraulic fluid chambers in response to a displacement of the throttling assembly by the valve displacing assembly, wherein a throttling flow area is progressively reduced as the valve approaches the closed position.

During a seating portion of the valve closing motion, hydraulic pressure in the second hydraulic fluid chamber is approximately constant.

The system may further include an assembly for biasing the throttling assembly towards an engagement position with the displacing assembly.

In accordance with an embodiment of the present invention, the second hydraulic fluid chamber is provided in a screw body. The assembly for throttling includes a plunger having an internal passage for providing selective hydraulic communication between the first and second hydraulic fluid chambers. The plunger may include a cross-notched face adapted to contact the valve displacing assembly. Alternatively, the plunger may include a nose adapted to contact the valve displacing assembly. The internal passage in the plunger may be partially occluded by the screw body when the plunger is in a home position. Furthermore, the internal passage may include a plurality of holes. An assembly for adjusting the home position of the plunger may also be provided.

The internal passage in the plunger may include a vertical passage communicating with the second hydraulic fluid chamber and a cross passage communicating with the first hydraulic fluid passage.

Additionally, the second hydraulic fluid chamber may be provided in the valve displacing assembly.

In accordance with the present invention, the throttling assembly may include a plunger having a lower end contained within the valve displacing assembly, an upper end extending out of the valve displacing assembly, and an internal passage for providing selective hydraulic fluid communication between the first and second hydraulic fluid chambers. The hydraulic pressure in the second hydraulic fluid chamber during a seating portion of the valve closing motion may be approximately constant. An assembly for biasing the throttling assembly towards an engagement position with the valve displacing assembly may also be provided such that the internal passage in the plunger is partially occluded by the valve displacing assembly when the plunger is in a home position.

The present invention is also directed to a system for decelerating a linearly displaceable valve undergoing a closing motion, the system having a housing, a hydraulic fluid chamber provided in the housing, and a assembly for displacing the valve responsive to the supply of hydraulic fluid to the hydraulic fluid chamber. The system further includes a hydraulic circuit for receiving hydraulic fluid from the hydraulic fluid chamber during the valve closing motion, and an assembly for throttling a flow of hydraulic fluid between the hydraulic fluid chamber and the hydraulic circuit in response to a displacement of the throttling assembly by the valve displacing assembly. The hydraulic pressure in the hydraulic fluid chamber opposes the valve closing motion and a throttling flow area is progressively reduced as the valve approaches the closed position.

The present invention may further include an assembly for biasing the throttling assembly towards and engagement position with the valve displacing assembly. The throttling assembly may be provided in a screw body. The throttling assembly may further include a plunger having an internal passage for providing selective hydraulic fluid communication between the hydraulic fluid chamber and the hydraulic circuit. The plunger may include a spherical end adapted to mate with a conical depression in the valve displacing assembly, thereby routing flow from the hydraulic fluid chamber to the hydraulic circuit through the throttling assembly. The internal passage in the plunger may be partially occluded by the screw body when the plunger is in a home position.

In accordance with the present invention, a loose-fitting plunger may be adapted to mate with the valve displacing assembly, thereby routing flow from the hydraulic fluid chamber to the hydraulic circuit around the plunger through the throttling assembly. The throttling assembly may include a pin attached to the screw body which progressively occludes a fluid passage in the plunger as the valve approaches the closed position.

BRIEF DESCRIPTION OF THE DRAWINGS

The present invention will now be described in connection with the following figures in which like reference numbers refer to like elements and wherein:

FIG. 4 is a cross section in elevation of a first valve catch system embodiment of the present invention;

FIG. 5 is a cross section in elevation of the plunger occluding hole during a first operational position of the valve catch system shown in FIG. 4;

FIG. 6 is a cross section in elevation of the plunger occluding hole during a second operational position of the valve catch system shown in FIG. 4;

DETAILED DESCRIPTION OF THE INVENTION

Figure 1:
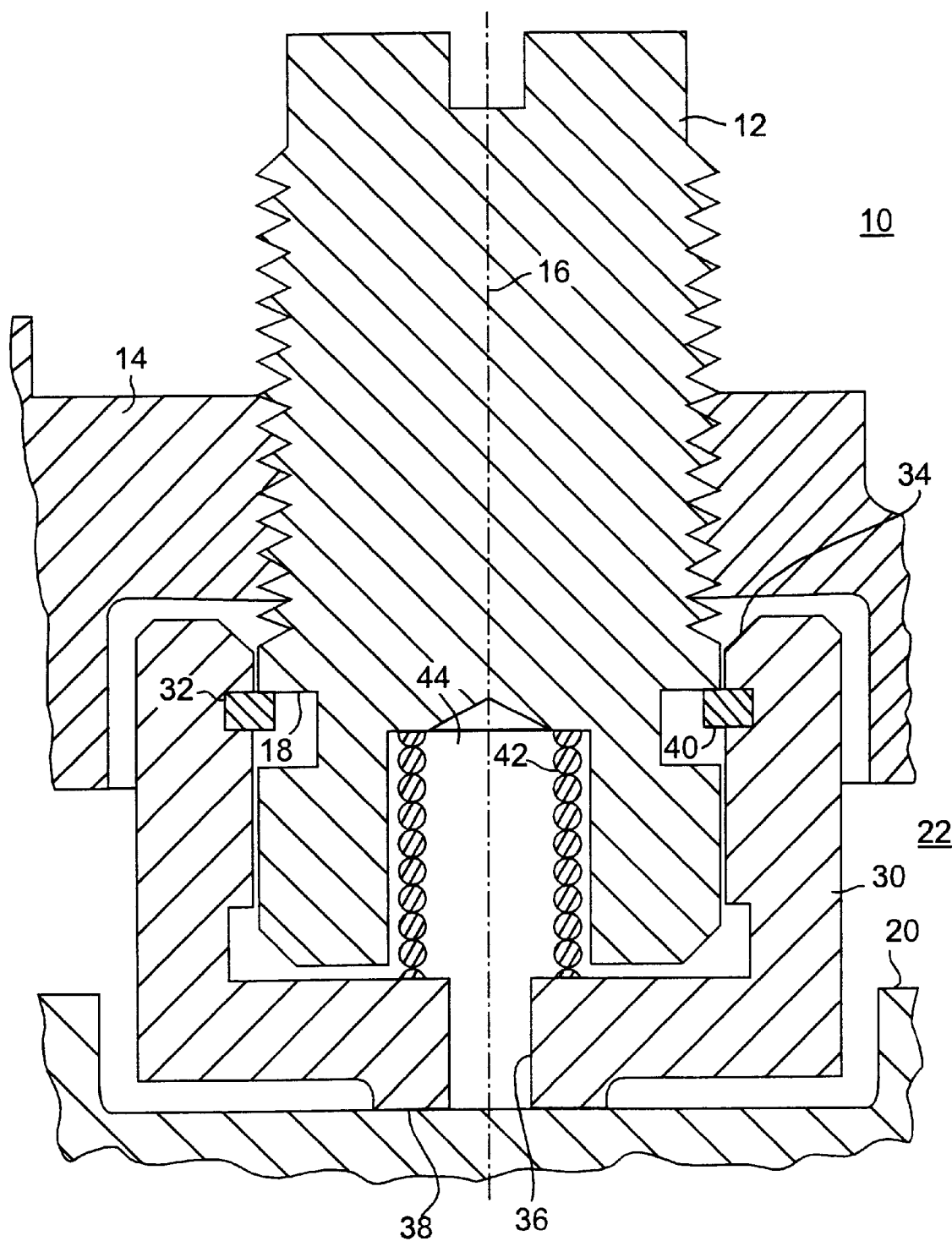
FIG. 1 is a cross section in elevation of an engine brake timing control device disclosed in U.S. Pat. No. 5,186,141.
Figure 2:
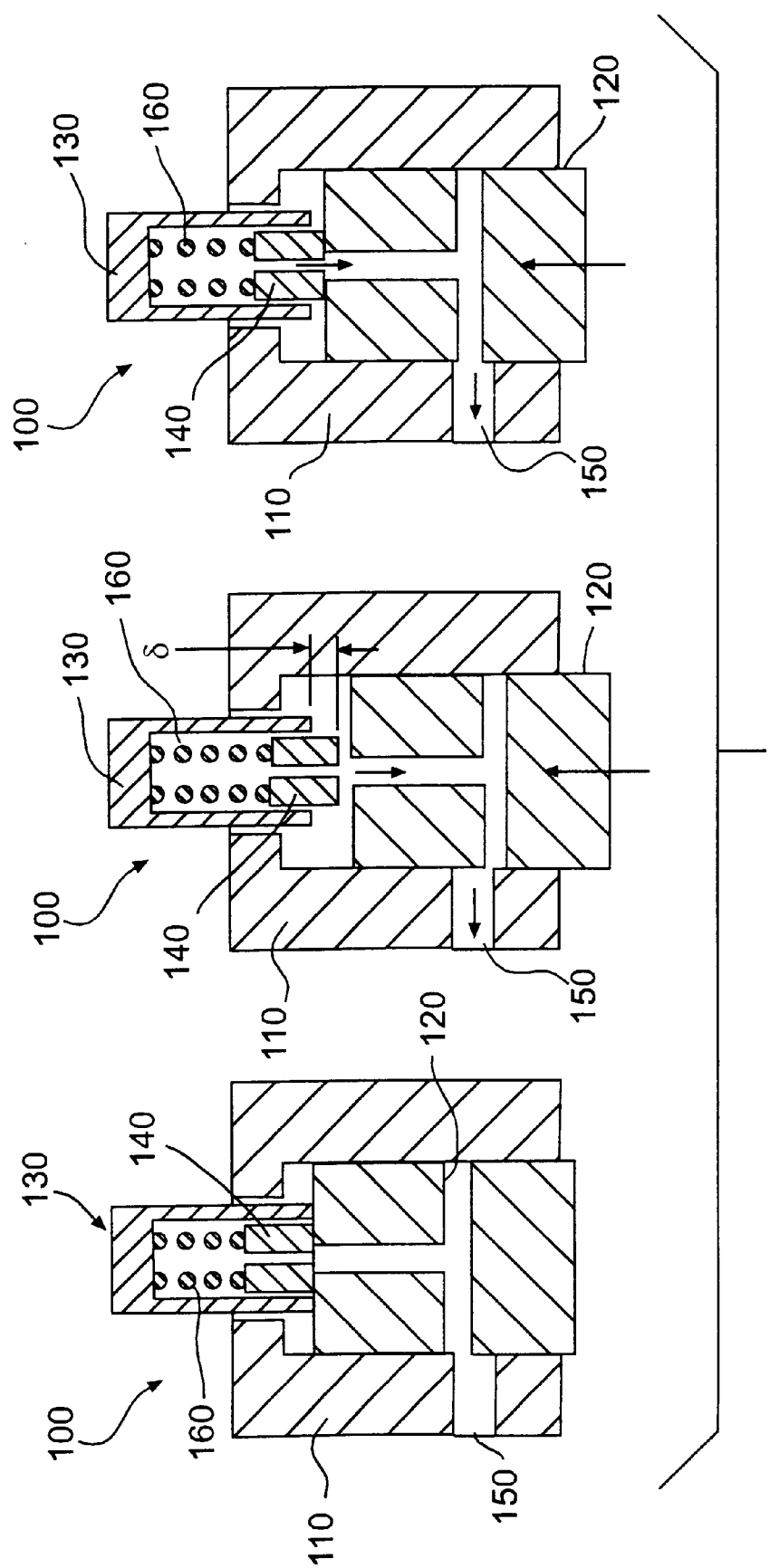
FIG. 2 is a cross section in elevation of a first valve catch design.
Figure 3:
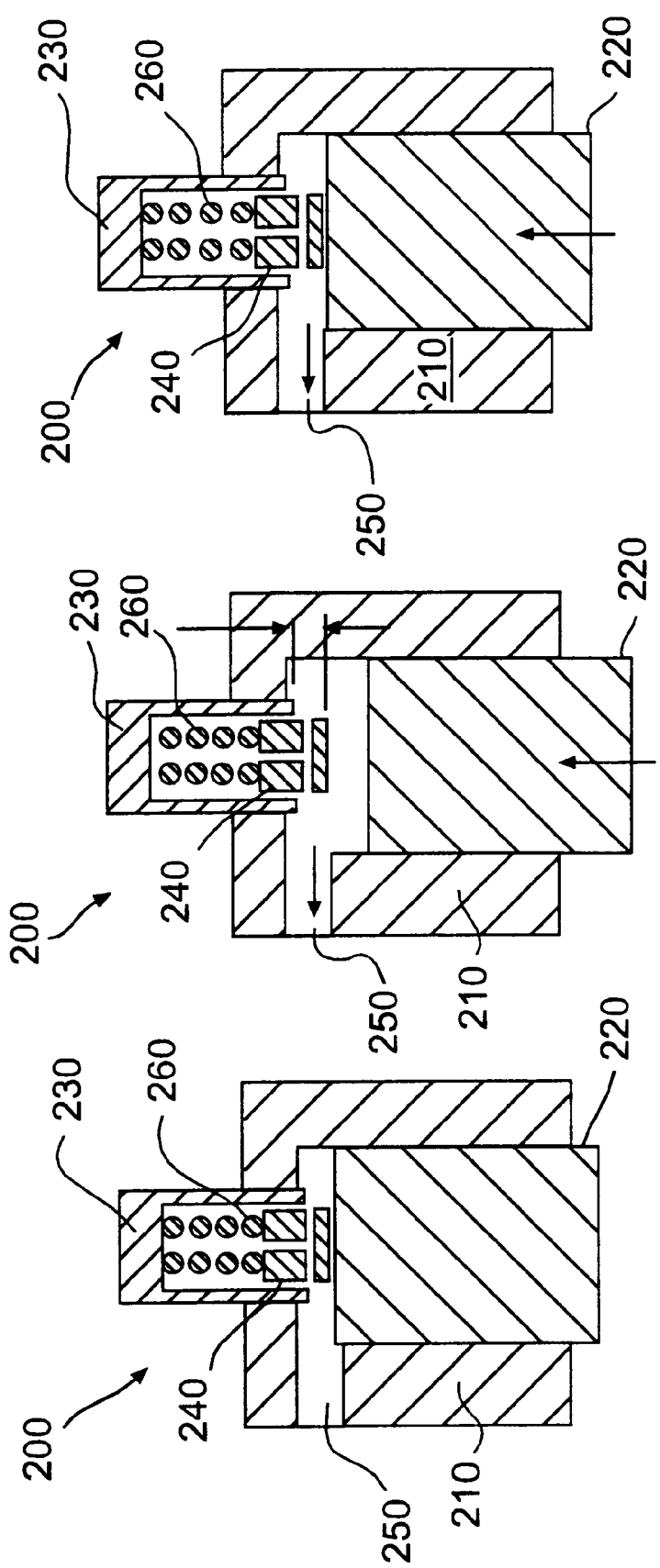
FIG. 3 is a cross section in elevation of a second valve catch design.

Reference will now be made in detail to a first embodiment of the present invention, an example of which is illustrated in the accompanying drawings. The first embodiment of the invention is shown in FIG. 4, as valve catch system 300.

The system 300 provides valve seating control by developing valve catch plenum pressure with variable flow resistance during valve closing motions. The system 300 is provided with a slave piston 320 disposed in a slave piston chamber 312 provided in an actuator housing 310. The slave piston 320 is slidable within the housing 310 so that it may open an engine valve (not shown) below it. Hydraulic fluid may flow to and from the slave piston chamber 312 via a feed passage 350.

A screw body 330 extends through the top of the housing 310 and provides an end wall for the slave piston chamber 312. The screw body 330 may be screwed in and out of the housing 310 to adjust for variation in valve train lash as needed. The screw body 330 may be secured in place by a locking nut 338. The screw body 330 may include an adjustable screw 332 extending into an interior chamber 336 provided within the screw body. An advantage of using the adjustable screw 332 is that the threads, if not sealed with a substance like Loctite, can provide a leakage path for air which may be trapped in the screw body chamber 336.

With continued reference to FIG. 4, a plunger 340 may be provided with an upper end 342 slidably disposed in the interior chamber 336 and a lower end extending out of the screw body 330 and into the slave piston chamber 312. The plunger 340 may be biased by a spring 360 towards the slave piston 320. The spring 360 engages the lower end of the adjustable screw 332. The plunger 340 may include a vertical passage 344 and a cross passage 346. The vertical passage and the cross passage collectively provide hydraulic communication between the screw body interior chamber 336 and the slave piston chamber 312. The bottom of the plunger 340 may include one or more cross notches 348 and a chamfered edge to increase the pressure area acting on slave piston 320 and to reduce the suction force upon separation of the plunger 340 from the slave piston 320 during opening of the engine valve. The plunger 340 preferably has a diameter nearly equal to the slave piston 320 diameter.

The cross passage 346 in the plunger 340 is positioned so that it is partially occluded by the screw body 330 at the point at which the slave piston 320 first contacts the plunger as the engine valve is closing. FIG. 5 shows the orientation of the cross passage 346 relative to the screw body 330 at the point of valve catch engagement by the slave piston 320.

The operation of the valve catch system shown in FIG. 4 is now described starting from the condition in which the engine valve is seated and the cam driving the slave piston is on base circle. The spring 360 biases the plunger 340 to rest against the slave piston 320. As cam lift progresses, hydraulic fluid flows into the slave piston chamber 312 through the feed 350 causing the pressure in the slave piston chamber to increase and force the slave piston downward. As the slave piston 320 opens the engine valve, the plunger 340 may or may not follow it downward. The maximum downward displacement by the plunger 340 is dictated by the engagement of a plunger shoulder 342 with a screw body shoulder 334. The spring 360 positions the plunger 340 at the maximum downward displacement before the valve seating event. The amount of the maximum downward displacement of the plunger 340 may be adjusted by turning the screw body 330 into or out of the housing 310.

After the valve opening event, the slave piston 320 returns upward under the influence of the cam or the release of pressure from the slave piston chamber 312. Eventually the bottom of the plunger 340 engages the top of the slave piston (typically at an engine valve lift of less than 1 mm). At this point the engine valve velocity may be approximately 150 in/sec, while the required seating velocity may be less than 15 in/sec. Once the slave piston 320 contacts the plunger 340, the engine valve (not shown), the slave piston, and the plunger move together. From this point on, the upward motion of the plunger 340 forces the hydraulic fluid in the interior chamber 336 through the vertical passage 344 and the cross passage 346 thereby increasing the pressure in the interior chamber 336 to approximately 6000 psi. As the engine valve approaches its seat, the cross passage 346 is progressively occluded by the screw body 330, so that the pressure in the interior chamber 336 is maintained approximately constant while the engine valve velocity is reduced. Constant interior chamber 336 pressure results roughly in a constant rate of engine valve deceleration.

FIGS. 5 and 6 show the detail of the progressive occlusion of the cross passage 346 during a valve seating event. FIG. 5 shows the detail of the position of the cross passage 346 relative to the screw body 330 at the point that the slave piston 320 engages the plunger 340. FIG. 6 shows the detail of the position of the cross passage 346 relative to the screw body 330 at the point that the engine valve is fully seated.

The system shown in FIG. 4 provides more reliable valve seating over a range of engine operation conditions due to the variable area orifice of the cross passage 346. The diameter of the lower section of plunger 340 and the orifice are selectively designed to be large enough to keep pressures within the interior chamber 336 low enough that compliance does not cause problems. Compliance is also favorably impacted because the volume of hydraulic fluid that is exposed to high pressure is reduced as compared with existing designs. Furthermore, this embodiment of the present invention also allows for a slave piston of reduced weight and length. While the embodiment shown in FIG. 4 may increase flow resistance through the plunger 340 it does not increase flow resistance in and out of the slave piston chamber 312. It is noted that embodiments of the present invention should be manufactured with care due to the potential for misalignment and the tight clearances required for the system to operate properly.

Figure 7:
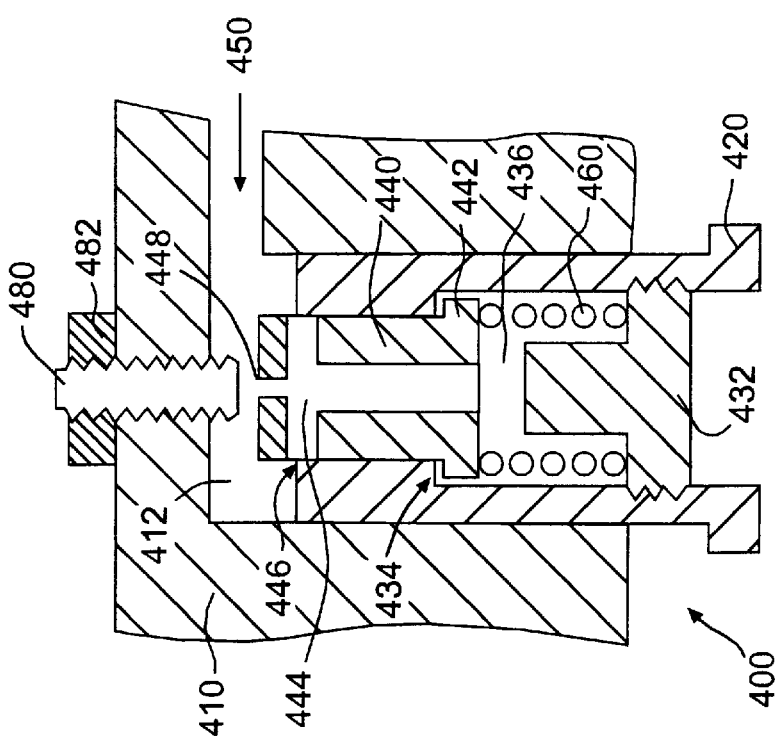
FIG. 7 is a cross section in elevation of second valve catch system embodiment of the present invention.

With reference to a second embodiment of the invention shown in FIG. 7, a variable flow restriction valve catch plunger 440 may be incorporated into the slave piston 420 of the system 400. With respect to FIG. 7, the system 400 is provided with a slave piston 420 disposed in a slave piston chamber 412 provided in an actuator housing 410. The slave piston 420 is slidable within the housing 410 so that it may open an engine valve (not shown) below it. Hydraulic fluid may flow to and from the slave piston chamber 412 via a feed passage 450.

A plunger 440 may be provided with a lower end slidably disposed in the interior chamber 436 of the slave piston 420, and an upper end extending out of the top of the slave piston and into the slave piston chamber 412. The plunger 440 may be biased upward by a spring 460 towards a lash adjuster 480. Spring 460 must be stiff enough to overcome inertial effects which tend to make the plunger 440 loose contact with stop 434 during engine valve closing. The distance that the plunger 440 may slide into the slave piston 420 may be adjusted by screwing a plug 432 into and out of the slave piston.

The plunger 440 may include a vertical passage 444, a cross passage 446, and an optional hole 448. The vertical passage and the cross passage collectively provide hydraulic communication between the interior chamber 436 and the slave piston chamber 412. The plunger 440 preferably has a diameter nearly equal to the slave piston 420 diameter. The cross passage 446 in the plunger 440 is positioned so that it is partially occluded by the upper edge of the slave piston 420 at the point at which the plunger 440 first contacts the lash adjuster 480. The optional fill hole 448 facilitates rapid upward deployment of plunger 440 when the engine valve is open. The lash adjuster 480 extends through the top of the housing 410 and provides a stop for the plunger 440. The lash adjuster 480 may be screwed in and out of the housing 410 to adjust the point of plunger engagement as needed to compensate for variation in valve train lash. The lash adjuster 480 may be secured in place by a locking nut 482.

The design shown in FIG. 7 should solve a potential problem of there being insufficient clearance of the locking nut 338 in the first embodiment of the invention. The embodiment shown in FIG. 7 should not require a plunger with a cross notched face With respect to a third embodiment of the invention shown in FIG. 8, the system 500 is designed similarly to the system 300 shown in FIG. 4, except that the bottom of the plunger 540 is spherical in order to seal against a conical seat provided in the slave piston 520. In the system 500, the hydraulic fluid flow path extends from the slave piston chamber 512 through the passage 524, peripheral recess 522, and feed passage 550 to a master piston and/or accumulator (not shown).

A screw body 530 extends through the top of the housing 510. The screw body 530 may be screwed in and out of the housing 510 to adjust for variation in valve train lash. The screw body 530 may include an adjustable screw or plug 532 extending into an interior chamber 536 provided within the screw body.

The lower section of the plunger 540 slides with tight clearance in screw body 530. The upper section provides a stop which limits extension of the plunger 540 into the slave piston chmaber 512. The plunger 540 may be biased by a spring 560 towards the slave piston 520. The plunger 540 may include a vertical passage 544 and a cross passage 546. The vertical passage and the cross passage collectively provide hydraulic communication between the screw body interior chamber 536 and the slave piston chamber 512. The bottom the plunger 540 may be spherical, as noted above.

Figure 8:
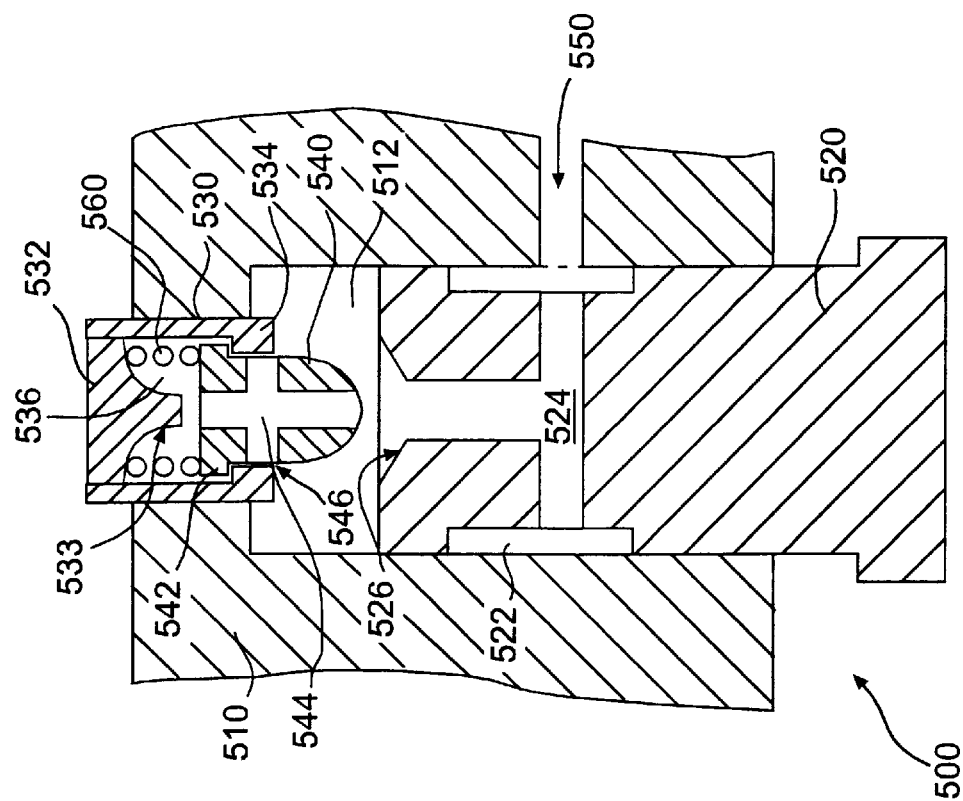
FIG. 8 is a cross section in elevation of third valve catch system embodiment of the present invention.

With continued reference to FIG. 8, during initial valve opening the plunger 540 is pushed up creating a large flow area. Prior to valve seating, the main flow area is cut off by mating of the spherical end of the plunger 540 with the conical seat or depression in the top of the slave piston 520, forcing the flow through the passages in the plunger. As the plunger moves up, the cross passage 546 is occluded by the screw body 530. The combined leakage of hydraulic fluid past the conical seat 526 and around the plunger 540 must be small compared to the flow through the occluding cross passage 546. An advantage of this design compared to the designs in FIGS. 4–7 is that high pressure acts over the entire slave piston area during engine valve seating. This increased pressure area results in lower peak pressure, which favorably impacts compliance. A potential disadvantage is increased parasitic loss and a consequent increased hydraulic cooling requirement.

Figure 10:
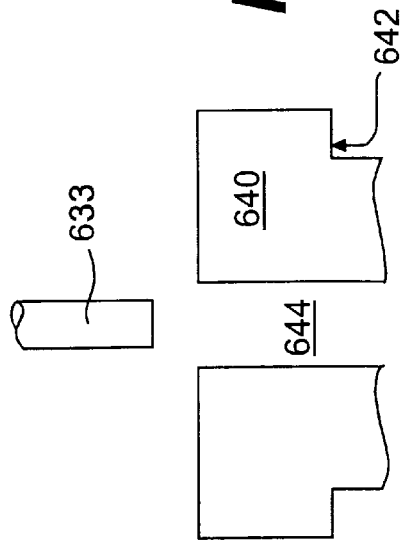
FIG. 10 is a cross section in elevation of the plunger occluding pin during a first operational position of the valve catch system shown in FIG. 9.
Figure 11:
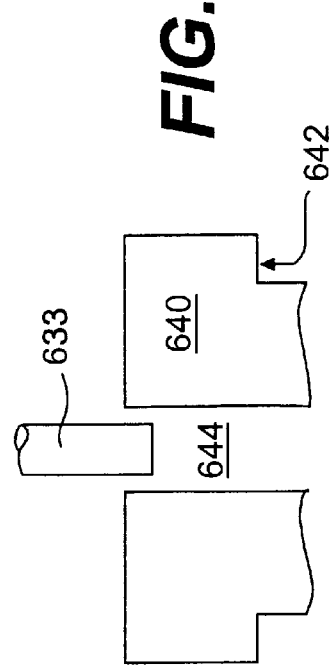
FIG. 11 is a cross section in elevation of the plunger occluding pin during a second operational position of the valve catch system shown in FIG. 9.
Figure 14:
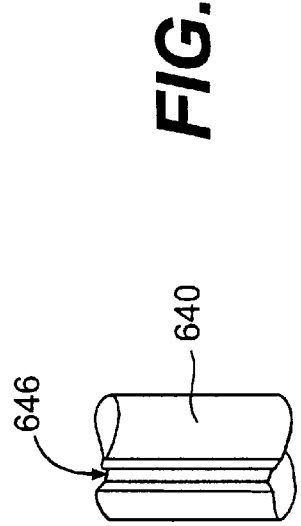
FIG. 14 is a pictorial view of a plunger having longitudinal notches used in an embodiment of the invention.
Figure 9:
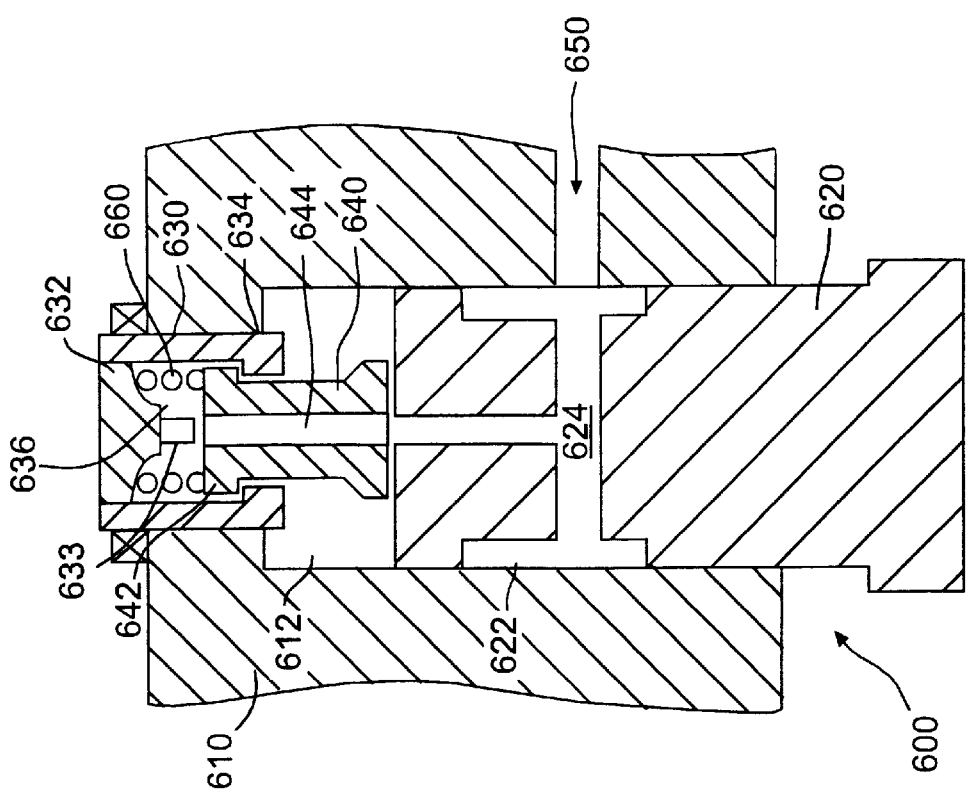
FIG. 9 is a cross section in elevation of fourth valve catch system embodiment of the present invention.

FIG. 9 discloses a system which provides a variable flow area using the central passage 644 in the plunger 640 and a pin 633 attached to the plug 632. The plunger 640 may have a loose clearance so its orientation will adjust to seal the hole in the top of the slave piston 620. With reference to FIGS. 9 and 14, the plunger 640 may have one or more longitudinal notches 646 to facilitate additional hydraulic fluid flow between the interior chamber 636 and the slave piston chamber 612. FIGS. 10 and 11 provide a detailed illustration of the interaction of the pin 633 with the upper end of the plunger 642 during valve seating. As in the system disclosed in FIG. 8, high pressure acts over the entire slave piston area during engine valve seating.

Figure 12:
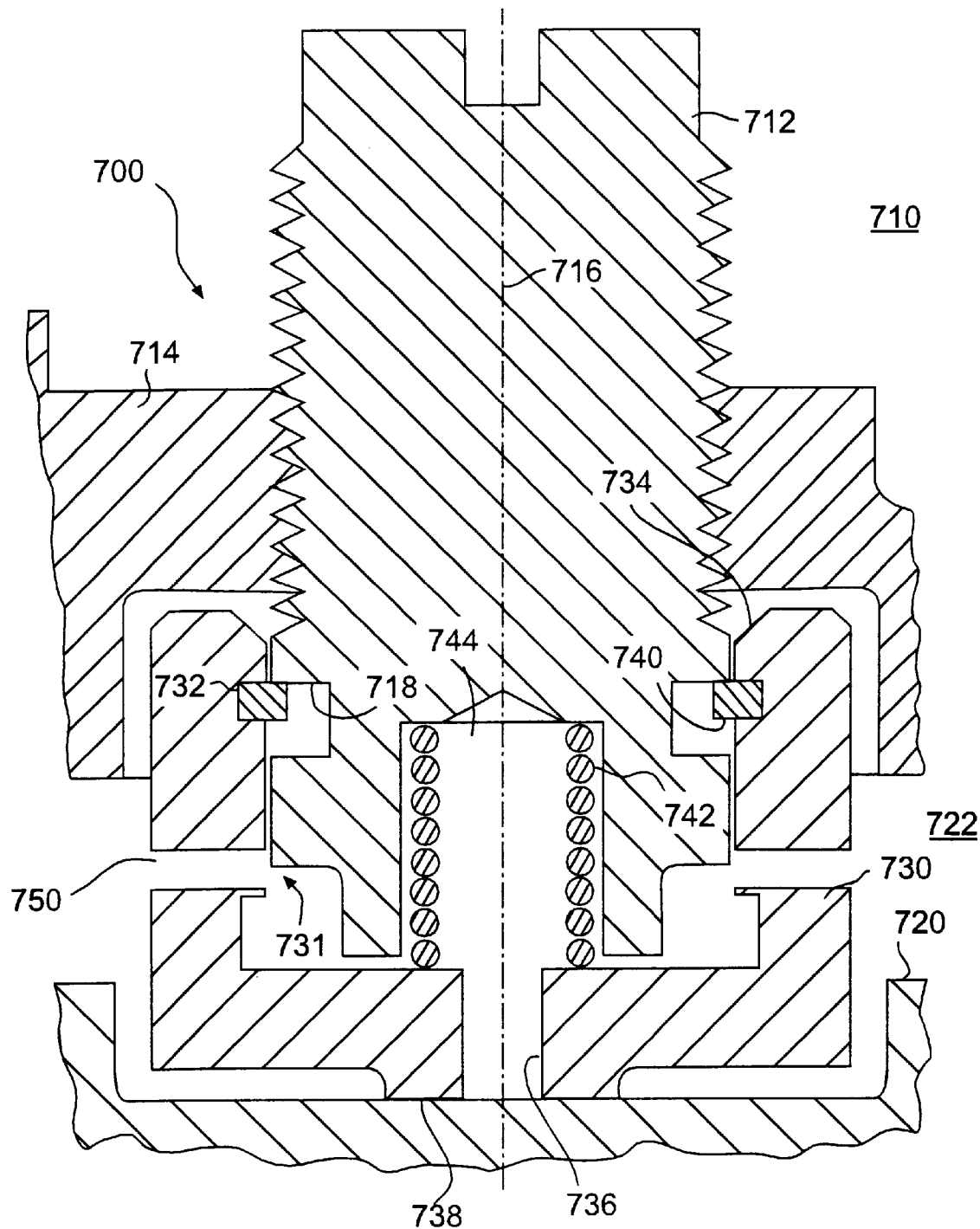
FIG. 12 is a cross section in elevation of fifth valve catch system embodiment of the present invention.

A fifth embodiment of the invention is shown in FIG. 12. The system 700 shown in FIG. 12 includes: a housing 714; a screw body 716; a cup 730; a nose on the bottom of the cup 738; a fill hole 736; orifice holes 750; a spring 742; a snap ring 740 and a snap ring groove 718.

With continued reference to FIG. 12, the screw body 716 is threaded into the housing 714 over a slave piston 720 providing adjustment of the axial position of the valve actuator 710 relative to the point of valve seating to compensate for variation in valve train lash. A locking nut (not shown) may be provided to prevent the position of the screw body 716 from changing relative to the housing 714. The cup 730 fits over the bottom of the screw body 716 with a tight diametrical clearance. The snap ring 740 attaches the cup 730 to the screw body 716 and provides hard stops for the maximum and minimum cup displacement. Alternatively, the snap ring groove 718 may be designed so that contact between the cup 730 and the screw body 716 limits cup displacement. In this case, vertical notches in the top of the cup 730 may facilitate assembly of snap ring 740. The screw body 716 includes an open chamber 744, or valve actuator plenum, at its end facing the cup 730. Spring 742 is located within the plenum 744. The spring 742 biases the cup 730 toward the slave piston 720, in an extended position. A nose 738 is provided on the bottom of the cup 730 to reduce the suction force upon separation of the cup 730 from the slave piston 720 during the opening of the engine valve. A hole 736 is provided in the bottom of the cup 730 to fill the valve actuator plenum 744 with fluid, equalizing pressure and allowing the cup 730 to extend rapidly.

The invention includes some number of holes 750 in the side of the cup 730 which are partially occluded by the screw body 716 during valve seating. The holes 750 provide increased resistance to the flow of fluid out of the valve actuator plenum 744 as the engine valve approaches its seat.

The assembly of the valve actuator shown in FIG. 12 will now be described. The valve actuator is screwed down until the snap ring 740 contacts the top of the groove 718 on the screw body 716 or alternatively, the cup 730 contacts the screw body 716. At that point, the cup 730 contacts the top of the slave piston 720, and the slave piston contacts the crosshead or engine valve (not shown), while the engine valves are held closed by the stiff valve springs (not shown). At this point, the sealing edge 731 is either in line or slightly above the bottom of the orifice holes 750. From this minimum displacement hard stop position, the screw body 716 is backed off a specified amount (typically 0.3 mm), which is chosen to ensure that the valve actuator will never reach its minimum displacement hard stop before the engine valve seats. This procedure, similar to lash adjustment, compensates for manufacturing variations.

At the start of an engine valve lift event, the nose 738 on the cup increases the pressure area on the top of the slave piston 720 and reduces the suction effect as the slave piston pulls away from the valve actuator cup 730. The spring 742 pushes the cup 730 down 1–2 mm as fluid fills through the hole 736 in the bottom of the cup 730.

Prior to engine valve seating, the extended cup 730 contacts the top of the slave piston sealing off the hole 736. Fluid is forced out through the occluding holes 750, which builds pressure in the valve actuator plenum 744, and slows the slave piston and engine valve assembly. The flow area of the occluding holes 750 decreases with decreasing engine valve and cup 730 lift. The valve actuator is designed in order to provide a roughly constant rate of deceleration of the slave piston 720 and engine valve assembly during valve seating. This requires a constant retarding force, a constant valve actuator plenum pressure, and an occluding orifice hole area proportional to engine valve velocity. The required seating velocity is typically ten to twenty times less than the maximum engine valve velocity prior to the slave piston 720 contacting the cup 730. Factors such as tolerances also affect the optimal occluding orifice configuration.

Figure 13:
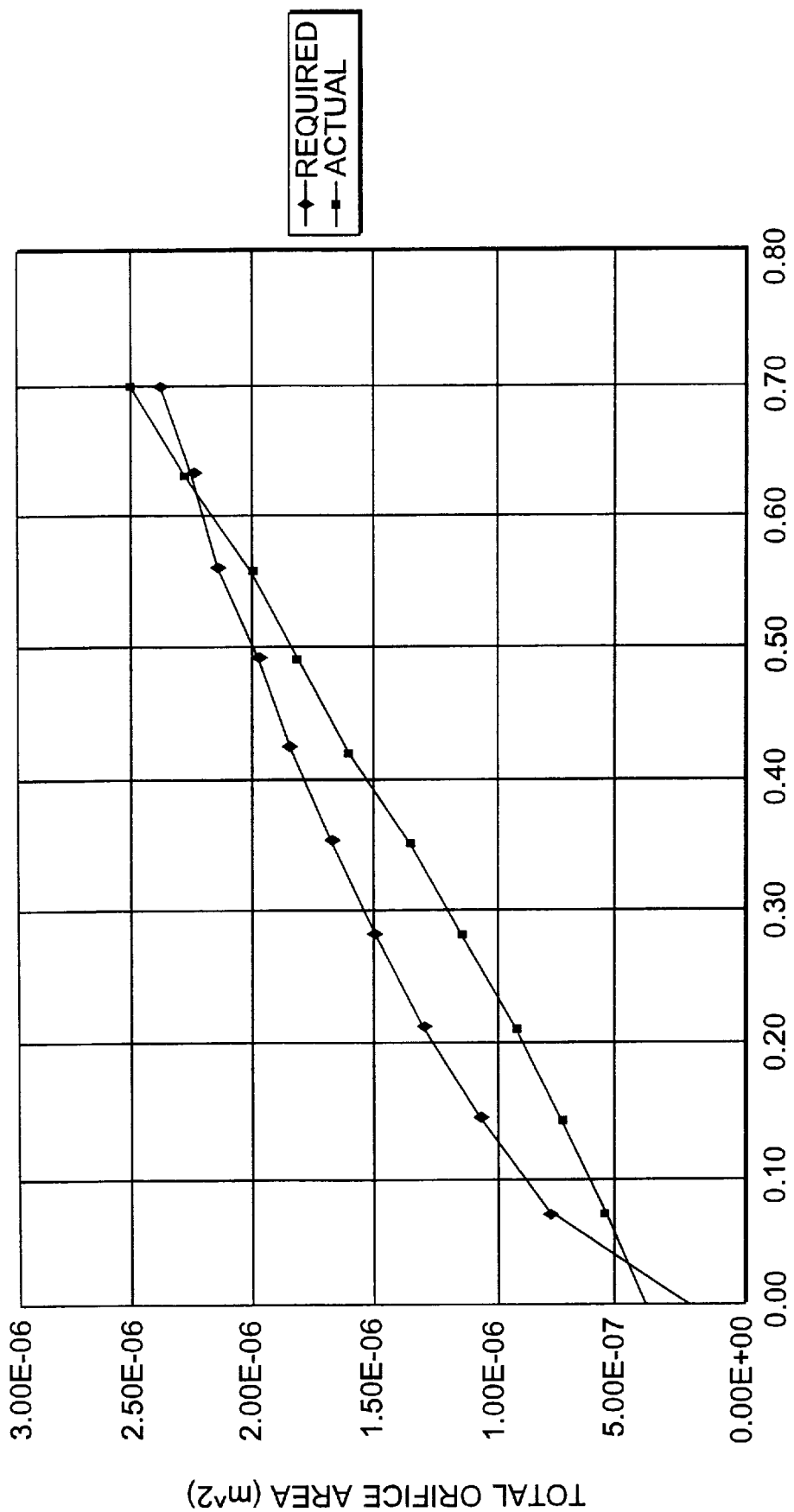
FIG. 13 is a graph of orifice area profile for constant deceleration.

The graph shown in FIG. 13 illustrates the approximate orifice area required for near constant engine valve deceleration for given distances between valve catch engagement and valve catch seating. The number of occluding holes 750, their diameter, and their location in cup 730 are chosen to have approximately the proper profile of total orifice area vs. engine valve lift for constant deceleration of the engine valve between valve catch engagement and engine valve seating. The diameter and location of multiple occluding holes may be different.

It will be apparent to those skilled in the art that various modifications and variations can be made in the construction, configuration, and/or operation of the present invention without departing from the scope or spirit of the invention. For example, in the embodiments mentioned above, various changes may be made to the shape and size of the components used. Furthermore, the shape and positioning of the variable area orifice may be changed so long as the desired deceleration profile for the engine valve is maintained. Thus, it is intended that the present invention cover the modifications and variations of the invention provided they come within the scope of the appended claims and their equivalents.

What is claimed is:

1. A system for decelerating a linearly displaceable valve undergoing a closing motion, said system having a housing, a first hydraulic fluid chamber provided in said housing, and means for displacing said valve responsive to the supply of hydraulic fluid to said first hydraulic chamber, wherein said system comprises:
   a second hydraulic fluid chamber wherein hydraulic pressure in said second hydraulic fluid chamber opposes the valve closing motion as said valve approaches a closed position; and
   means for throttling the flow of hydraulic fluid between said second and first hydraulic fluid chambers in response to a displacement of said throttling means by said valve displacing means, wherein a throttling flow area is progressively reduced as said valve approaches said closed position, and wherein said means for throttling comprises a plunger having an internal passage for providing selective hydraulic communication between said first and second hydraulic fluid chambers.

2. The system according to claim 1, wherein hydraulic pressure in said second hydraulic fluid chamber during a seating portion of the valve closing motion is approximately constant.

3. The system according to claim 1, wherein said plunger includes a cross-notched face adapted to contact said valve displacing means.

4. The system according to claim 1, wherein said plunger includes a nose adapted to contact said valve displacing means.

5. The system according to claim 1, wherein said internal passage in said plunger comprises a vertical passage communicating with said second hydraulic fluid chamber and a cross passage communicating with said first hydraulic fluid passage.

6. The system according to claim 1, wherein said second hydraulic fluid chamber is provided in a screw body.

7. The system according to claim 6, wherein said internal passage in said plunger is partially occluded by said screw body when said plunger is in a home position.

8. The system according to claim 7, wherein said internal passage comprises a plurality of holes.

9. The system according to claim 7, further comprising means for adjusting said home position of said plunger.

10. The system according to claim 1, wherein said second hydraulic fluid chamber is provided in said valve displacing means.

11. The system according to claim 10, wherein the hydraulic pressure in said second hydraulic fluid chamber during a seating portion of the valve closing motion is approximately constant.

12. The system according to claim 10, further comprising means for biasing said throttling means towards an engagement position with said valve displacing means.

13. The system according to claim 10, wherein said means for throttling comprises a plunger having a lower end contained within said valve displacing means, an upper end extending out of said valve displacing means, and an internal passage for providing selective hydraulic fluid communication between said first and second hydraulic fluid chambers.

14. The system according to claim 13, wherein said internal passage in said plunger comprises a vertical passage communicating with said second hydraulic fluid chamber and a cross passage communicating with said first hydraulic fluid passage.

15. The system according to claim 13, wherein said internal passage in said plunger is partially occluded by said valve displacing means when said plunger is in a home position.

16. The system according to claim 15, wherein said internal passage comprises a plurality of holes.

17. The system according to claim 15, farther comprising means for adjusting said home position of said plunger.

18. A system for decelerating a linearly displaceable valve undergoing a closing motion, said system having a housing, a hydraulic fluid chamber provided in said housing, and a means for displacing said valve responsive to the supply of hydraulic fluid to said hydraulic fluid chamber, wherein said system comprises:

a hydraulic circuit for receiving hydraulic fluid from said hydraulic fluid chamber during the valve closing motion; and means for throttling a flow of hydraulic fluid between said hydraulic fluid chamber and said hydraulic circuit in response to a displacement of said throttling means by said valve displacing means, wherein hydraulic pressure in said hydraulic fluid chamber opposes said valve closing motion wherein a throttling flow area is progressively reduced as said valve approaches said closed position, and wherein said means for throttling comprises a plunger having an internal passage for providing selective hydraulic fluid communication between said hydraulic fluid chamber and said hydraulic circuit.

19. The system according to claim 18, further comprising means for biasing said throttling means towards and engagement position with said valve displacing means.

20. The system according to claim 18, wherein said plunger includes a spherical end adapted to mate with a conical depression in said valve displacing means, thereby routing flow from said hydraulic fluid chamber to said hydraulic circuit through said throttling means.

21. The system according to claim 18, wherein said internal passage comprises a plurality of holes.

22. The system according to claim 18, wherein said internal passage in said plunger comprises a vertical passage communicating with said hydraulic circuit and a cross passage communicating with said hydraulic fluid chamber.

23. The system according to claim 18, wherein said throttling means is provided in a screw body.

24. The system according to claim 23, wherein said internal passage in said plunger is partially occluded by said screw body when said plunger is in a home position.

25. The system according to claim 24, further comprising means for adjusting said home position of said plunger.

26. The system according to claim 18, wherein a loose-fitting plunger is adapted to mate with said valve displacing means, thereby routing flow from said hydraulic fluid chamber to said hydraulic circuit around said plunger through said throttling means.

27. The system according to claim 26, wherein said throttling means comprises a pin attached to said screw body which progressively occludes a fluid passage in said plunger as said valve approaches the closed position.

28. The system according to claim 27 wherein said pin has longitudinal notches.

* * * * *